United States Patent [19]

Takahashi et al.

[11] 4,354,754
[45] Oct. 19, 1982

[54] INDICATOR DEVICE WITHIN THE VIEWFINDER OF A CAMERA

[75] Inventors: Yosuke Takahashi, Sagamihara; Toshikatsu Kasui, Tokyo; Nobuaki Sasagaki, Kawasaki, all of Japan

[73] Assignee: Nippon Kogaku K.K., Tokyo, Japan

[21] Appl. No.: 270,622

[22] Filed: Jun. 4, 1981

[30] Foreign Application Priority Data

Jun. 9, 1980 [JP] Japan .............................. 55-79226[U]
Jun. 12, 1980 [JP] Japan .............................. 55-80970[U]

[51] Int. Cl.³ ........................ G03B 17/00; G03B 13/02
[52] U.S. Cl. ..................................... 354/289; 354/198
[58] Field of Search ................ 354/289, 219, 53, 199, 354/200, 201, 195, 198, 25, 222, 225

[56] References Cited

U.S. PATENT DOCUMENTS 3,357,328 12/1967 Kinder et al. ...................... 354/222
3,727,530 4/1973 Aoki ................................. 354/199 X
4,104,651 8/1978 Matsumoto et al. ........... 354/201 X
4,140,378 2/1979 Suzuki et al. ......................... 354/53
4,208,115 6/1980 Proske ................................. 354/201

*Primary Examiner*—Donald A. Griffin
*Attorney, Agent, or Firm*—Fitzpatrick, Cella, Harper & Scinto

[57] ABSTRACT

This specification discloses an indicator device within the viewfinder of a camera for indicating a predetermined range substantially centrally of the viewfinder field frame. The indicator device comprises at least one electro-optical element for indicating the predetermined range, the optical characteristic of the electro-optical element being variable by an electrical signal information, an information circuit for putting out photographing information, and a control circuit for producing an electrical signal information corresponding to the output of the information circuit and varying the optical characteristic of the electro-optical element.

4 Claims, 13 Drawing Figures

INDICATOR DEVICE WITHIN THE VIEWFINDER OF A CAMERA

BACKGROUND OF THE INVENTION

1. Field of the Invention

This invention relates to an information indicating device for a camera for indicating photographing information within the viewfinder of the camera by means of an electro-optical element.

2. Description of the Prior Art

A viewfinder device for a camera is known in which the object image is formed within the viewfinder field frame and photographing information is indicated around the viewfinder field frame. However, such device according to the prior art has made it necessary for the eye to be moved in order to observe the object image or confirm the photographing information, and this has been inconvenient for viewfinder observation.

SUMMARY OF THE INVENTION

It is an object of the present invention to eliminate the above-noted disadvantage peculiar to the prior art and to provide an information indicating device for a camera which facilitates viewfinder observation.

To overcome the above-noted disadvantage, according to the present invention, a predetermined range is indicated substantially centrally of the view finder field frame by electro-optical display means and the indicated condition of the predetermined range is varied by controlling the electro-optical display means in accordance with photographing information. Accordingly, the present invention can indicate photographing information substantially centrally of the viewfinder field frame and this is convenient for viewfinder observation and at the same time, the indicator means itself which indicates the predetermined range indicates the photographing information and this means simplicity of the indication and ease of viewfinder observation.

Also, to overcome the above-noted disadvantage, according to the present invention, in a viewfinder device having a borderline disposed substantially centrally of the viewfinder field frame, indication of photographing information by the electro-optical element is effected along the borderline.

Generally, an electro-optical element indicates information in a condition in which it intercepts light, namely, in its colored condition, and extingnishes the indication in a condition in which it does not intercept light, namely, in its achromatized condition. However, the electro-optical element does not become completely colorless and transparent even if it becomes achromatized. Accordingly, even if an electro-optical element is disposed in the viewfinder light path and the electro-optical element is achromatized as required to thereby extinguish the indication within the viewfinder field frame, the electro-optical element will intercept some of the viewfinder observation light to make the viewfinder field difficult to see.

The present invention indicates photographing information substantially centrally of the viewfinder field frame and, this is convenient for viewfinder observation and at the same time, the indication by the electro-optical element is effected along the borderline in the viewfinder field frame and therefore, even if the electro-optical element becomes achromatized, the electro-optical element is inconspicuous due to the presence of the borderline, thus facilitating the viewfinder observation.

The invention will become more fully apparent from the following detailed description thereof taken in conjunction with the accompanying drawings.

DESCRIPTION OF THE PREFERRED EMBODIMENTS

Some embodiments of the present invention will hereinafter be described with reference to the drawings. All of the following embodiments are applied to a single lens reflex camera, but the present invention is not restricted to a single lens reflex camera.

Figure 1:
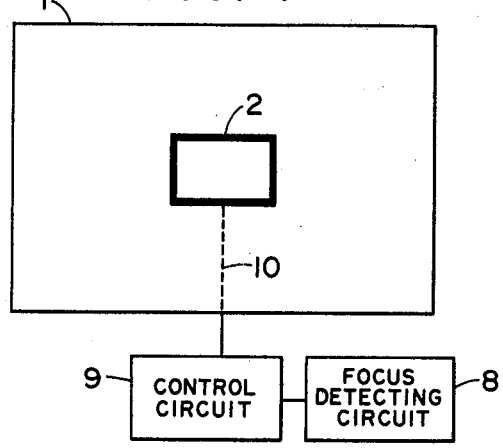
FIGS. 1 and 2 schematically show a first embodiment of the present invention.
Figure 2:
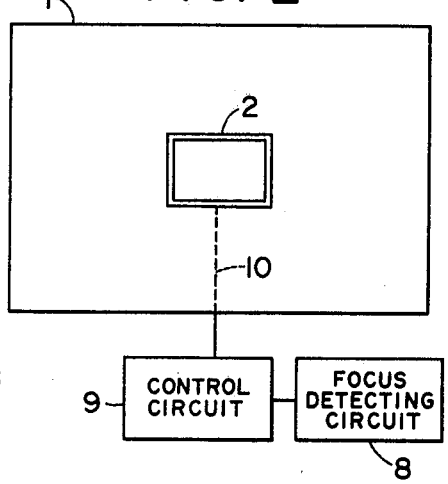

FIGS. 1 and 2 show a first embodiment of the present invention. A focusing screen 1 is disposed at a position conjugate with the film surface (not shown), namely, the focal plane, and a light passed through a phototaking lens which has been reflected by a quick return mirror (not shown) is projected upon this focusing screen 1. An entirely solid type electrochromic element (transmitting type) 2 is provided on the focusing screen 1. This electrochromic element is provided directly on the focusing screen 1 by evaporation. The element 2, as shown, forms a frame indicating the focus detecting range substantially centrally of the focusing screen 1. A focus detecting circuit 8 is a conventional one. A control circuit 9 applies an electrical signal to the electro-optical element 2 in response to the output of the detecting circuit 8. A transparent electrode 10 is capable of transmitting the electrical signal from the control circuit 9 to the element 2. The element 2 is controlled by this electrical signal.

Operation will now be described. First, when the object image imaged by a phototaking lens (not shown) is not present on the film surface (focal plane), the focus detecting circuit 8 detects this. Accordingly, the control circuit 9 does not apply an electrical drive signal to the electrochromic element 2. However, an element which has a concentration identifiable in the viewfinder picture plane (a first concentration) even in a condition in which the drive signal is not applied thereto (achromatized condition) is selected as the electrochromic element 2. Accordingly, the viewfinder image observed in the viewfinder eyepiece portion (not shown) (the image within the viewfinder field frame) becomes one in which the shadow of the focus detecting range frame 2 of FIG. 2, situated substantially centrally of the viewfinder field frame, and the object image overlap each other. When the phototaking lens is operated to bring about a condition in which the object image is formed on the film surface (focal plane), the focus detecting circuit 8 detects this and the control circuit 9 applies an electrical drive signal to the electrochromic element 2. Accordingly, the electrochromic element becomes colored (colored condition) as shown in FIG. 1, and changes to a concentration (a second concentration) thicker than, and distinguishable from, the aforementioned first concentration. When the concentration of the electrochromic element 2 thus changes from the condition of FIG. 2 to the condition of FIG. 1, the quantity of light passed through the element also changes and the concentration of the focus detecting range frame in the viewfinder field frame also changes. By this concentration change, it is indicated that the phototaking lens is in a condition (in-focus condition) in which it forms the object image on the film surface (focal plane). The viewfinder observer can thus recognize the in-focus condition.

The electrochromic element in the above-described embodiment becomes colored when a voltage is applied in the positive direction, and becomes achromatized when the application of the voltage is cut off or the application electrodes are short-circuited or a voltage is applied in the opposite direction, and in the present embodiment, "the condition in which the drive signal has been applied" refers to the former and "the condition in which the drive signal is not applied" refers to the latter. Short-circuiting the electrodes or applying a voltage in the opposite direction in "the condition in which the drive signal is not applied" is for the purpose of obtaining the achromatized condition on the spot from the colored condition and, even if such condition is released or the application of the voltage is cut off after the achromatization, the achromatized condition of the element is maintained. This also holds true of other electro-optical elements. Accordingly, if, as previously mentioned, an element which can obtain the first concentration in its achromatized condition is selected as the electro-optical element, indication of a predetermined range frame will become possible without consuming power in the achromatized condition.

In the first embodiment hitherto described, the first concentration is obtained in the condition in which the electrical drive signal is not applied to the electrochromic element (the achromatized condition). However, the voltage in the positive direction applied to the electrochromic element may be varied such that the first concentration is obtained when the control circuit 9 applies a low voltage to the element and that the second concentration is obtained when the control circuit 9 applies a high voltage to the element. That is, the concentration change may also be obtained in accordance with the strength of the electrical drive signal.

Figure 3:
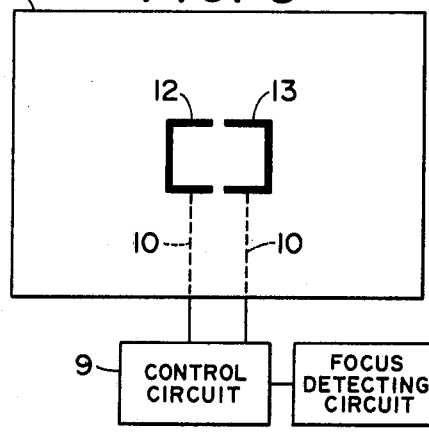
FIGS. 3 to 5 schematically show a second embodiment of the present invention.
Figure 4:
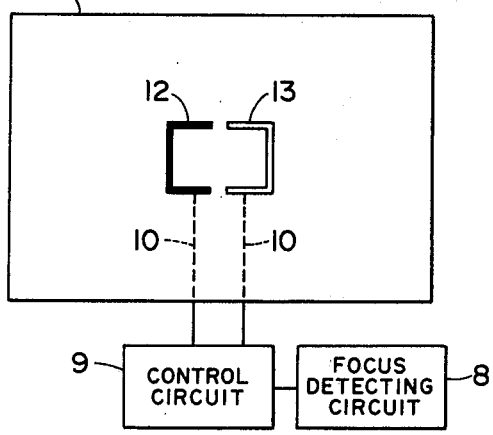
Figure 5:
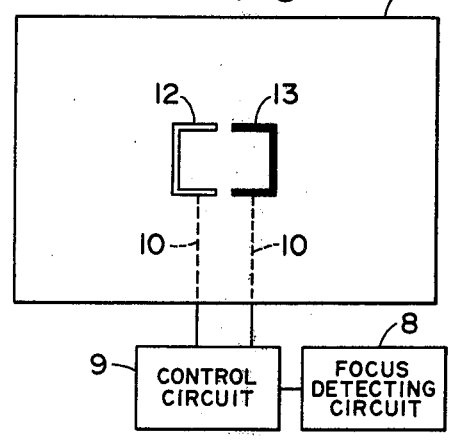

FIGS. 3 to 5 show a second embodiment. This embodiment differs from the above-described first embodiment in that the frame indicating the focus detecting range is constituted by two electrochromic elements 12 and 13. In the other points, it is similar to the first embodiment.

The electrochromic elements 12 and 13 change to the first concentration in the condition in which the drive signal is not applied thereto (the achromatized condition), and change to the second concentration in the condition in which the drive signal is applied thereto (the colored condition).

Operation will now be described in detail. In the present embodiment, when the object image formed by the phototaking lens is situated rearwardly of the film surface (focal plane) (rear focus), the focus detecting circuit 8 detects this. The control circuit 9 applies a drive signal only to one element 13. When the object image is situated forwardly of the film surface (front focus), the focus detecting circuit 8 detects this and the control circuit 9 applies a drive signal only to the other element 12. When the object image has come to be situated on the film surface (in-focus condition), the focus detecting circuit 8 detects this and the control circuit 9 applies a drive signal to both elements 12 and 13. Accordingly, in the rear focus condition, as shown in FIG. 5, one element 12 assumes the first concentration and the other element 13 assumes the second concentration which is thicker than the first concentration, and in the front focus condition, as shown in FIG. 4, one element 12 assumes the second concentration and the other element 13 assumes the first concentration. In the in-focus condition, as shown in FIG. 3, both elements 12 and 13 assume the second concentration. Accordingly, the viewfinder image observed in the viewfinder eyepiece portion becomes one in which the object image overlaps each condition of FIGS. 3–5. Thus, in the present embodiment, in what position the object image is situated with respect to the film surface can be recognized with the aid of a combination of the concentration changes of the elements 12 and 13 located substantially centrally of the viewfinder field frame.

Figure 6:
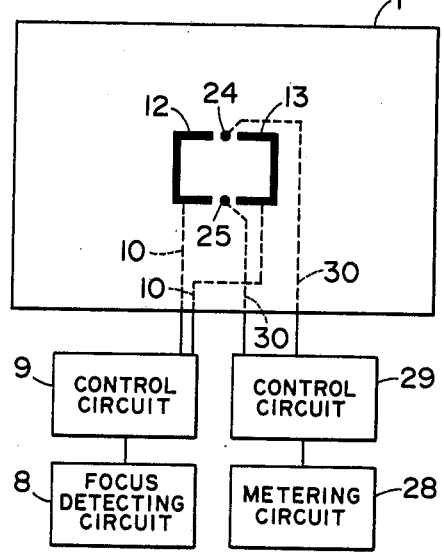
FIGS. 6 to 8 schematically show a third embodiment of the present invention.
Figure 7:
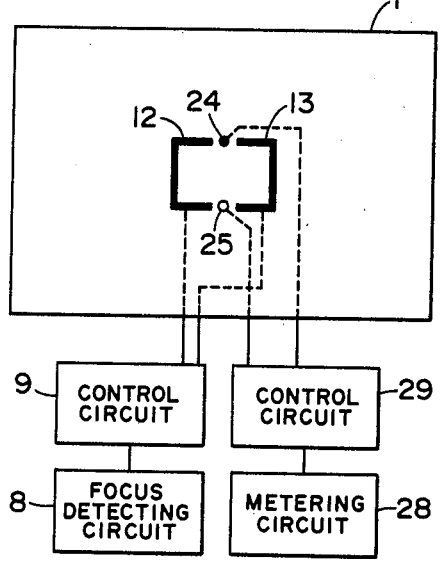
Figure 8:
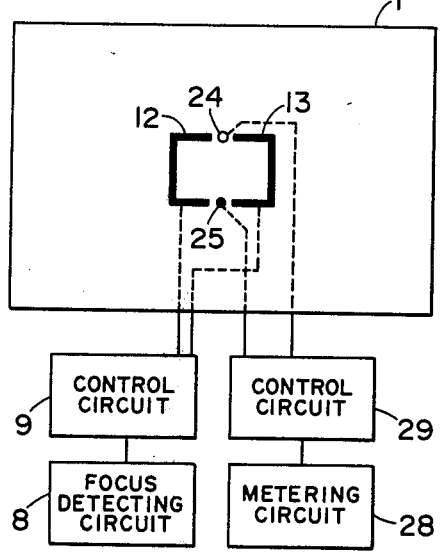

FIGS. 6 to 8 show a third embodiment. In this embodiment, two electrochromic elements 24 and 25 are added to the second embodiment. In the other points, the construction and operation of this embodiment are similar to those of the second embodiment and therefore need not be described.

The electrochromic elements 24 and 25 are both provided on the focusing screen 1 and situated between elements 12 and 13 for indicating the focus detecting range frame. The elements 24 and 25 are both connected through a transparent electrode 30 to a control circuit 29 which produces an electrical output corresponding to the output of a metering circuit 28, and are controlled entirely separately from the other elements 12 and 13. The elements 24 and 25 change to the first concentration in a condition in which the drive signal is not applied thereto (achromatized condition), and change to the second concentration in a condition in which the drive signal has been applied thereto (colored condition).

The operation of this embodiment is as follows. At the time of over-exposure, the control circuit 29 applies a drive signal only to the element 24 in response to the output of the metering circuit 28 and only this element 24 assumes the second concentration as shown in FIG. 7. At the time of under-exposure, the control circuit 29 applies a drive signal only to the element 25 in response to the output of the metering circuit and only this element 25 assumes the second concentration as shown in FIG. 8. At the time of proper exposure, both elements 24 and 25 assume the second concentration as shown in FIG. 6.

Accordingly, if, as shown in FIG. 6, the elements 24 and 25 assume the second concentration in the viewfinder field and further the elements 12 and 13 assume the second concentration, it can be indicated that proper exposure condition has been obtained and that in-focus condition has been obtained.

Figure 9:
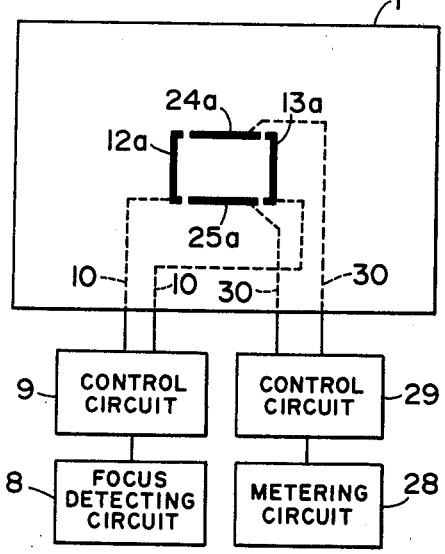
FIG. 9 schematically shows a fourth embodiment of the present invention.

FIG. 9 shows a fourth embodiment. This embodiment differs from the third embodiment only in the configuration of electrochromic elements 12a, 13a, 24a and 25a, and in the other points, the construction and operation of this embodiment are entirely the same as those of the third embodiment.

In the hitherto described embodiments, the frame indicating the focus detecting range, namely, the frame for selecting the object which is the subject of focus detection, has been described as the frame indicating the predetermined range, but the metering range may be indicated by this frame. Assuming that the metering range is indicated by a frame like that of the second embodiment, the indication may be made in such a manner that over-exposure is indicated when only the element 13 has assumed the second concentration, under-exposure is indicated when only the element 12 has assumed the second concentration, and proper exposure is indicated when both elements 12 and 13 have assumed the second concentration.

Also, in the illustrated embodiments, the electrochromic elements have been shown as being provided directly on the focusing screen, but according to the present invention, the electrochromic elements need not always be provided on the focusing screen. However, where the present invention is applied to a single lens reflex camera, it is preferable that the electrochromic elements be provided on the focusing screen or on a transparent base plate disposed adjacent thereto.

The electrochromic elements have so far been described as the electro-optical elements, whereas use may of course be made of liquid crystal or other electro-optical elements.

Further, the embodiments have been described as using the transmitting type (which intercepts light to thereby indicate information) of electro-optical elements, whereas the present invention may of course be achieved also by using the reflecting type (which reflects light to thereby indicate information) of electro-optical elements.

According to each embodiment described above in detail, indication of other photographing information can be effected by the use of an element indicating a predetermined range substantially centrally of the viewfinder field. Accordingly, the indication within the viewfinder becomes simple as compared with a case where indications are provided separately from each other.

Further, if a predetermined range of frame is formed by at least two electro-optical elements as shown in the above-described embodiments and the concentration of each of the electro-optical elements is controlled, more information may be indicated by this frame.

A fifth embodiment of the present invention will now be described with reference to the drawings.

Figure 10:
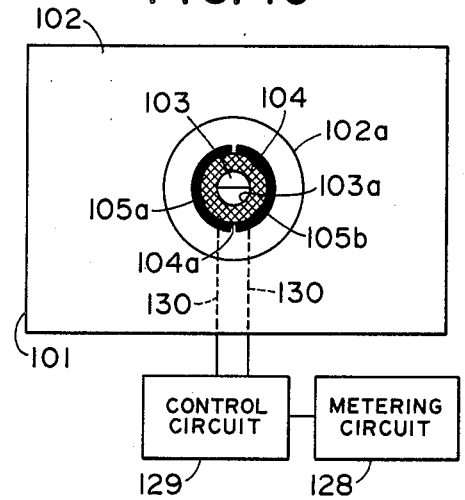
FIGS. 10 to 12 schematically show a fifth embodiment of the present invention.
Figure 11:
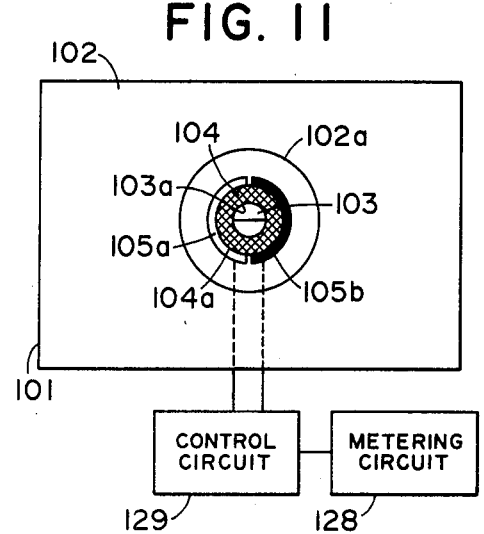
Figure 12:
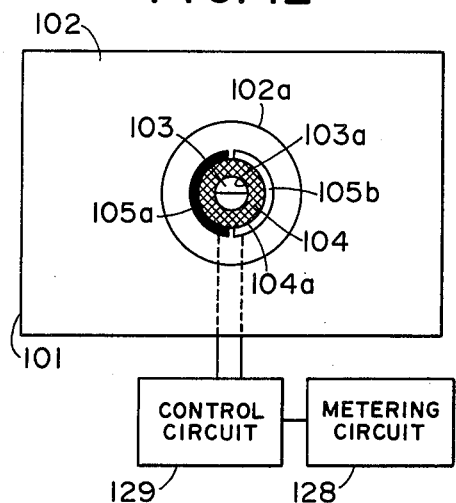

FIGS. 10 to 12 illustrate an embodiment in which the present invention is applied to a single lens reflex camera. In these Figures, a focusing screen 101 is disposed at a position conjugate with the film surface (not shown), and phototaking light reflected by a quick return mirror (not shown) is projected upon this focusing screen 101. The focusing screen 101 has the most part thereof formed by a mat surface 102, and a split prism 103 is disposed in the central portion thereof and a microprism 104 is disposed outside thereof. A borderline 103a is formed between the split prism 103 and the microprism 104, and a borderline 104a is formed between the microprism 104 and the mat surface 102. A borderline 102a is depicted in the mat surface 102 (outside of the borderline 104a) and shows the essential metering range of the center priority metering.

In the present embodiment, entirely solid type electrochromic elements (transmitting type) 105a and 105b are deposited by evaporation on the focusing screen 101 along the borderline 104a. One electrochromic element 105a is disposed on the left side of (or below) the borderline 104a and the other electrochromic element 105b is disposed on the right side of (or above) the borderline 104a. The electrochromic elements 105a and 105b are driven by a control circuit 129 which produces an electrical signal corresponding to the output of a metering circuit 128. The electrical signal produced by the control circuit 129 is transmitted to elements 105a and 105b through a transparent electrode 130. In response to the output of the metering circuit 128, at the time of overexposure condition, only the element 105b is colored as shown in FIG. 11, and at the time of underexposure condition, only the element 105a is colored as shown in FIG. 12, and at the time of proper exposure condition, both elements 105a and 105b are colored (see FIG. 10.)

The electrochromic elements 105a and 105b are disposed on the focusing screen 101, namely, in the viewfinder light path, and therefore, when colored, they intercept the viewfinder observation light. Accordingly, within the viewfinder field frame, only the portion of the colored electrochromic element becomes a shadow, which indicates exposure information. The viewfinder image in each exposure information indicating condition (the image within the viewfinder field frame) is one in which the object image overlaps any of FIGS. 10 to 12.

In the condition of FIG. 11, the element 105a has become achromatized and in the condition of FIG. 12, the element 105b has become achromatized, but as previously noted, electro-optical elements such as electrochromic elements or liquid crystal do not become completely colorless and transparent even if they become achromatized. Accordingly, even if the electro-optical element has become achromatized, this electro-optical element somewhat intercepts the viewfinder observation light. In the present embodiment, however, the electro-optical elements 105a and 105b are disposed along the borderline 104a and therefore, even when one of the electro-optical elements is in achromatized condition, the electro-optical element in its achromatized condition is inconspicuous due to the presence of the borderline 104a.

Figure 13:
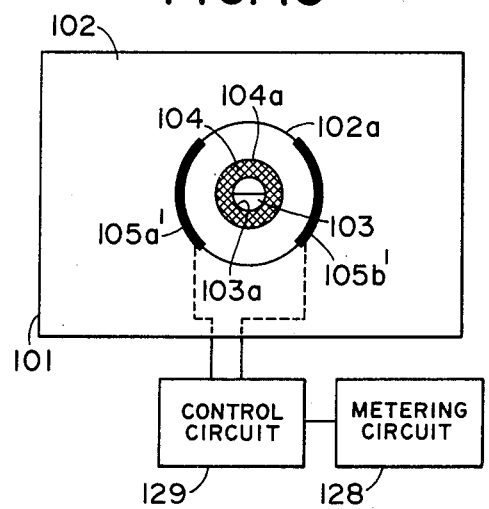
FIG. 13 schematically shows a sixth embodiment of the present invention.

The present embodiment has been described with respect to a case where the electrochromic elements are provided along the borderline 104a, but they may also be provided along other borderlines. FIG. 13 shows an embodiment in which electrochromic elements 105a' and 105b' are provided along the borderline 102a.

Also, as previously noted, liquid crystal instead of electrochromic elements may be provided as the electro-optical elements. However, it is desirable that, as in the present embodiment, entirely solid type electrochromic elements be employed as the electro-optical elements.

In the present embodiment, the electrochromic elements are provided on the focusing screen 101. In the case of a single lens reflex camera, it is preferable that the electrochromic elements be provided on the focusing screen or on a transparent base plate disposed adjacent thereto. However, the present invention is not restricted to a single lens reflex camera but is of course applicable also to a camera having a see-through type finder.

Further, in the present embodiment, exposure information is indicated by the electro-optical elements, but it is also possible that the electro-optical elements are associated, for example, with a focus detecting device so that only the element 105b is colored when the phototaking lens forms its focus rearwardly of the film surface (focal plane), that only the element 105a is colored when the phototaking lens forms its focus forwardly of the film surface (focal plane) and that both elements 105a and 105b are colored (or achromatized) when the phototaking lens forms its focus on the film surface. According to each of the above-described embodiments, the electro-optical elements are disposed in the viewfinder light path so that the indication by the electro-optical elements is effected along the borderline within the viewfinder field frame and therefore, even when the electro-optical elements are achromatized, the electro-optical elements are inconspicuous due to the presence of said borderline and the viewfinder field is not difficult to see.

We claim:

1. An indicator device within the viewfinder of a camera for indicating a predetermined range substantially centrally of the viewfinder field frame, said device comprising:
    electro-optical display means disposed in the viewfinder optical path to display said predetermined range, the display means including at least a first and a second electro-optical element each having an electro-optical effect, and the concentration of each electro-optical element being changed by electrical signal information;
    an information circuit for producing at least three kinds of outputs corresponding to photographing information; and
    a control circuit for producing electrical signal information corresponding to the output of said information circuit and changing the concentration of at least one of the first and second electro-optical elements to display three different states;
    whereby said display means indicates by the predetermined range at least three states corresponding to the photographing information.

2. An indicator device according to claim 1, wherein each of said electro-optical elements assumes a first concentration identifiable within the viewfinder field when an electrical drive signal is not applied thereto from said control circuit, and assumes a second concentration thicker than and distinguishable from said first concentration when an electrical drive signal is applied thereto from said control circuit.

3. An indicator device according to claim 1, wherein said predetermined range is a focus detecting range, and said display means, when the concentration of only said first electro-optical element is changed, indicates a state in which the object image is situated forwardly of the film surface; when the concentration of only the second electro-optical element is changed the display means indicates a state in which the object image is situated rearwardly of the film surface; and when the concentration of both the first and second electro-optical elements are simultaneously changed the display means indicates the in-focus state.

4. An indicator device within the viewfinder of a single lens reflex camera having a borderline which is formed on a focusing screen of the single lens reflex camera and divides a substantially central portion of the viewfinder field frame to at least two regions, said indicator device comprising:
    an electro-optical element having an electro-optical effect and disposed on the focusing screen or in the neighborhood of the focusing screen in the finder optical path, the electro-optical element is so contoured that an elongated display may be effected along said borderline, and that an elongated side of the display along the borderline may be in contact therewith or the display may be on the borderline, said electro-optical element being adapted to be changed by an electrical signal information into one of a condition in which it intercepts light and a condition in which it passes light therethrough;
    an information circuit for putting out photographing information; and
    a control circuit for producing an electrical signal information corresponding to the output of said information circuit and changing said electro-optical element into one of said two conditions.

* * * * *